United States Patent
Kapur et al.

(10) Patent No.: US 8,189,536 B2
(45) Date of Patent: May 29, 2012

(54) DELIVERY OF DATA PACKETS VIA AGGREGATED SPATIAL DISTRIBUTION OVERLAY ON A MESH NETWORK

(75) Inventors: Rahul Kapur, San Francisco, CA (US); Martin Turon, Berkeley, CA (US)

(73) Assignee: Memsic Transducer System Co., Ltd., Wuxi, Jiangsu Province (CN)

( * ) Notice: Subject to any disclaimer, the term of this patent is extended or adjusted under 35 U.S.C. 154(b) by 872 days.

(21) Appl. No.: 11/833,799

(22) Filed: Aug. 3, 2007

(65) Prior Publication Data
US 2007/0291689 A1 Dec. 20, 2007

Related U.S. Application Data

(63) Continuation-in-part of application No. 11/433,194, filed on May 11, 2006, which is a continuation-in-part of application No. 11/345,737, filed on Feb. 1, 2006, which is a continuation-in-part of application No. 11/152,350, filed on Jun. 13, 2005, which is a continuation-in-part of application No. 11/095,640, filed on Mar. 30, 2005, now Pat. No. 7,705,729, which is a continuation-in-part of application No. 11/096,098, filed on Mar. 30, 2005, now Pat. No. 7,369,047.

(51) Int. Cl.
*H04W 4/00* (2009.01)
(52) U.S. Cl. ........... 370/332; 370/328; 379/16; 379/272
(58) Field of Classification Search .................. None
See application file for complete search history.

(56) References Cited

U.S. PATENT DOCUMENTS

| | | | |
|---|---|---|---|
| 4,002,886 A | 1/1977 | Sundelin |
| 4,418,333 A | 11/1983 | Schwarzbach et al. |
| 4,766,295 A | 8/1988 | Davis et al. |
| 5,352,957 A | 10/1994 | Werner |
| 5,365,154 A | 11/1994 | Schneider et al. |
| 5,640,151 A | 6/1997 | Reis et al. |
| 5,697,061 A | 12/1997 | Krueger et al. |
| 5,841,365 A | 11/1998 | Rimkus |
| 5,995,015 A | 11/1999 | DeTemple et al. |
| 6,032,109 A | 2/2000 | Ritmiller, III |
| 6,078,269 A | 6/2000 | Markwell et al. |
| 6,208,247 B1 | 3/2001 | Agre et al. |
| 6,243,654 B1 | 6/2001 | Johnson et al. |
| 6,381,467 B1 | 4/2002 | Hill et al. |
| 6,392,562 B1 | 5/2002 | Boston et al. |
| 6,587,739 B1 | 7/2003 | Abrams et al. |

(Continued)

OTHER PUBLICATIONS

Crossbow Technology, "Xmesh Network Layer," 2006, 1 page.

(Continued)

*Primary Examiner* — Jae Y Lee
(74) *Attorney, Agent, or Firm* — Weingarten, Schurgin, Gagnebin & Lebovici LLP

(57) ABSTRACT

A plurality of interactive modules are disposed at spaced locations to form an adaptive wireless network. Each module is capable of receiving transmissions of messages or data packets from other modules, and of transmitting messages or data packets to other modules for forming selected transmission paths via one or more modules toward a base station. Upon failure of a transmission path, a module not capable of transmitting a message along a transmission path toward the base station, transmits a message to other of the plurality of modules to form a new transmission path via such other module.

3 Claims, 23 Drawing Sheets

U.S. PATENT DOCUMENTS

| | | |
|---|---|---|
| 6,690,289 B1 | 2/2004 | Odinak et al. |
| 6,745,027 B2 | 6/2004 | Twitchell, Jr. |
| 6,749,116 B2 | 6/2004 | Massaro |
| 6,750,769 B1 | 6/2004 | Smith |
| 6,822,568 B2 | 11/2004 | Gehlot et al. |
| 6,844,821 B2 | 1/2005 | Swartzel et al. |
| 6,859,831 B1 | 2/2005 | Gelvin et al. |
| 6,961,709 B2 | 11/2005 | Goodwin, III |
| 7,035,240 B1 | 4/2006 | Balakrishnan et al. |
| 7,090,125 B2 | 8/2006 | Goel et al. |
| 7,103,511 B2 | 9/2006 | Petite |
| 7,152,040 B1 | 12/2006 | Hawthorne et al. |
| 7,176,808 B1 | 2/2007 | Broad et al. |
| 7,231,180 B2 | 6/2007 | Benson et al. |
| 7,360,095 B2 | 4/2008 | Girouard et al. |
| 7,369,047 B2 | 5/2008 | Broad et al. |
| 7,397,368 B2 | 7/2008 | Otto et al. |
| 7,424,527 B2 | 9/2008 | Petite |
| 7,429,936 B2 | 9/2008 | Paradiso et al. |
| 7,440,735 B2 | 10/2008 | Karschnia et al. |
| 2002/0145978 A1* | 10/2002 | Batsell et al. ............. 370/238 |
| 2003/0025599 A1 | 2/2003 | Monroe |
| 2003/0043028 A1 | 3/2003 | Torikai et al. |
| 2003/0063585 A1 | 4/2003 | Younis et al. |
| 2004/0010492 A1 | 1/2004 | Zhao et al. |
| 2004/0098218 A1 | 5/2004 | Ito et al. |
| 2004/0122833 A1 | 6/2004 | Forth et al. |
| 2004/0171347 A1* | 9/2004 | Burton et al. ............. 455/11.1 |
| 2004/0174844 A1* | 9/2004 | Cho et al. ................ 370/328 |
| 2004/0233284 A1 | 11/2004 | Lesesky et al. |
| 2004/0246975 A1* | 12/2004 | Joshi ................... 370/395.31 |
| 2005/0030921 A1* | 2/2005 | Yau ........................ 370/329 |
| 2005/0099500 A1 | 5/2005 | Fujita |
| 2005/0131736 A1 | 6/2005 | Nelson et al. |
| 2005/0157698 A1* | 7/2005 | Park et al. ............... 370/351 |
| 2005/0218218 A1 | 10/2005 | Koster |
| 2005/0237153 A1 | 10/2005 | Chen |
| 2006/0130142 A1 | 6/2006 | Mester et al. |
| 2006/0176239 A1 | 8/2006 | Sweeney |
| 2006/0187040 A1 | 8/2006 | Sweeney |
| 2006/0220843 A1 | 10/2006 | Broad et al. |
| 2006/0229086 A1 | 10/2006 | Broad et al. |
| 2006/0271667 A1 | 11/2006 | Clow et al. |
| 2007/0132846 A1 | 6/2007 | Broad et al. |

OTHER PUBLICATIONS

IEEE Instrumentation and Measurement Society, "IEEE Standard for a Smart Transducer Interface for Sensors and Actuators—Transducers to Microprocessor Communication Protocols and Transducers Electronic Data Sheet (TEDS) Formats", IEEE Std. 1451.2-1997, 1998, The Institute of Electrical and Electronics Engineers, Inc., 125 Pages.

IEEE Standards for a Smart Transducer Interface for Sensors and Actuators—Mixed-Mode Communication Protocols and Transducer Electronic Data Sheet (TEDS) Formats, IEEE Standards 1451.4-2004, IEEE Instrumentation and Measurement Society, 2004, 439 Pages.

U.S. Appl. No. 11/152,350, filed Jun. 13, 2005, 33 Pages.

* cited by examiner

| Algorithm | Packets Sent | Packet Lost | Success Rate |
|---|---|---|---|
| XMesh | 1000 | 177 | 82.3% |
| Invention | 1000 | 0 | 100% |

Fig. 22

DELIVERY OF DATA PACKETS VIA AGGREGATED SPATIAL DISTRIBUTION OVERLAY ON A MESH NETWORK

RELATED APPLICATION

This application is a continuation-in-part of, and claims priority from, application Ser. No. 11/433,194 entitled "Adaptive Network and Method" filed on May 11, 2006 by A. Broad et al, which is a continuation-in-part of application Ser. No. 11/345,737 entitled "Interactive Surveillance Network and Method," filed on Feb. 1, 2006 by A. Broad et al, which is a continuation-in-part of application Ser. No. 11/152,350 entitled "Adaptive Surveillance Network and Method," filed on Jun. 13, 2005 by A. Broad, which is a continuation-in-part of application Ser. No. 11/095,640 entitled "Surveillance System and Method," filed on Mar. 30, 2005 by A. Broad et al, which issued as U.S. Pat. No. 7,705,729 on Apr. 27, 2010 and which is a continuation-in-part of application Ser. No. 11/096,098, "Adaptive Sensing Network," filed on Mar. 30, 2005 by A. Broad et al., which issued as U.S. Pat. No. 7,369,047 on May 6, 2008, which applications are incorporated herein in the entirety by this reference to form a part hereof.

FIELD OF THE INVENTION

This invention relates to mesh networks and more particularly to system and method for improving probability of packet delivery over low-bandwidth, poor quality links of a wireless network using an overlay of routing protocols on single-path routing schemes for delivery of data packets to a centralized location.

BACKGROUND OF THE INVENTION

Wireless Sensor Networks (WSN) use low-bandwidth radios to create a self-healing wireless mesh network. In WSN networks, nodes route data to a centralized point in the network referred to as a base station. Periodically each node shares its local neighborhood link information with the rest of the network. Each node uses this distributed link information to find the best path from itself to the base station. Data is then sent along this optimal path.

Most WSN mesh algorithms use single-path routing algorithms similar to algorithms commonly found in wired networks. These conventional algorithms are commonly adapted to take advantage of the wireless nature of the network by "overhearing" neighbor traffic to form detailed link estimates. These detailed link estimates are used to form an optimal single-path route to the base station. Wireless mesh networks of this type are described in the literature (see, for example, U.S. patent application Ser. No. 11/433,194).

Wireless link quality is known to vary over time. Since paths are formed on the basis of link quality estimates (or hop 'cost'), mesh algorithms must periodically use energy to recalculate the best path at the lowest hop cost to the base station. If the period between recalculations of the optimal path is too long, nodes may use bad paths. If the period used is short, the network will drain available energy (usually battery power) rapidly. Since the variation of link quality over time is difficult to determine, most algorithms choose a single network-wide period based on network lifetime. In most cases, if a path goes bad between update periods, the data sent along that path is lost.

Different solutions have been proposed for overcoming data loss due to poor path quality. The most widely used solution is packet retransmission. If a packet is unable to be sent over a path, then the packet is resent until it is received by the next node along a path to the base station. Most wired protocols like TCP use an end-to-end retransmission strategy. The sending node continually resends to the receiving node until an acknowledgement of receipt is delivered. However, a difficulty associated with end-to-end recovery along a single path is the unreliable characteristics of the wireless communication link. The error accumulates exponentially over multiple hops from link to link, causing a high probability of packet loss, as illustrated in the graph of FIG. 1.

This graph indicates the limitation of the end-to-end retransmission scheme. As the number of hops increases, even networks with good link quality have a lower probability of delivering data packets to a base station.

One known modification of the single-path routing introduces a link by link retry to the end to end retry. Forwarding nodes resend data to the parent until the parent acknowledges receipt of the packet. By retransmitting at the link level, the link quality is artificially improved at each hop. However, as the number of hops increases along the path, even a set of good quality links has a low probability of delivering data reliably, as illustrated in the graph in FIG. 2.

This graph illustrates the number of retransmissions required to make a poor link into a high quality link. However, even after 8 retransmissions, such link-level retransmission scheme cannot make a poor-quality link into a high-quality link, and there is still possibility for data to be lost over the path.

Another known modification of the single-path routing may be implemented in systems where delay in delivery of data packets is acceptable. Packets which were to be dropped due to poor path quality, can be stored locally until a better path is found. Thus, data is stored either at the originating node or the forwarding node, until a good path is found, at which time the packet is forwarded.

A Delay Tolerant Network (DTN) is an appropriate solution for data which can be stored and retrieved at a later time. However, in networks where data is time-sensitive and must be delivered by a hard deadline, storage for a later date is inappropriate.

For time-sensitive data to be delivered over a single-path mesh network, DTN is an inappropriate solution and an alternative is to then fall back to using retransmissions in order to force the data to the base station hop by hop, expending large amounts of energy.

However, even packet retransmissions have limitations. Long-hop networks and/or networks where link quality can become excessively poor can still lose data along poor quality paths while expending large amounts of energy.

In addition, retransmissions have a detrimental consequence in high density networks. Due to the low-bandwidth radios used at each node, retransmissions can saturate the bandwidth, causing congestion. Congestion decreases the link quality on all surrounding paths with the consequence that all paths within radio distance of the retransmitting node will also begin dropping packets, and this can lead to a full network collapse.

SUMMARY OF THE INVENTION

In accordance with one embodiment of the present invention, a wireless network and method of operation form a transmission route for data packets or messages from child node or module to parent node or module progressively along a single path toward a central or base station. In addition, if a data packet or message may be dropped during operation due to poor link quality, an embodiment of the present invention facilities "jumping" to alternative paths within the network toward the base station. Also, data that may have been stored because of poor quality or disconnected link for later forwarding, may be aggregated with other data packets for forwarding along a new path established by such a "jump". In this manner, time-sensitive data transmitted over long-hop networks can be more reliably delivered to the base station along an established route, or along a "jump" to an alternative route. Similarly, in high-density networks, the formation of an alternative "jump" route in accordance with the present invention obviates formation of congested parallel paths with concomitant savings of available energy and avoidance of repetitious attempts to retransmit data packets over a poor-quality link.

BRIEF DESCRIPTION OF THE DRAWINGS

FIG. 22 is a chart illustrating the data packets captured and retransmitted according to the present invention.

DETAILED DESCRIPTION OF THE INVENTION

Figure 1:
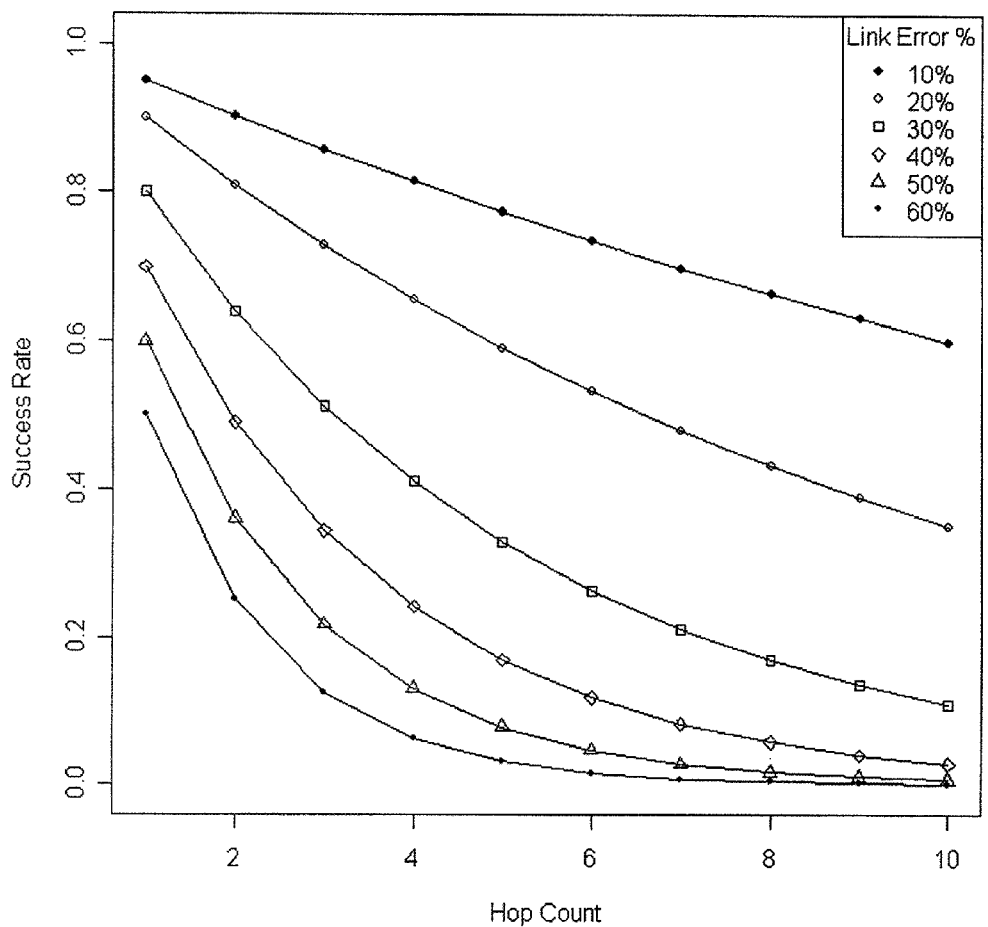
FIG. 1 is a graph illustrating an operating characteristic of end-to-end retransmission schemes.
Figure 2:
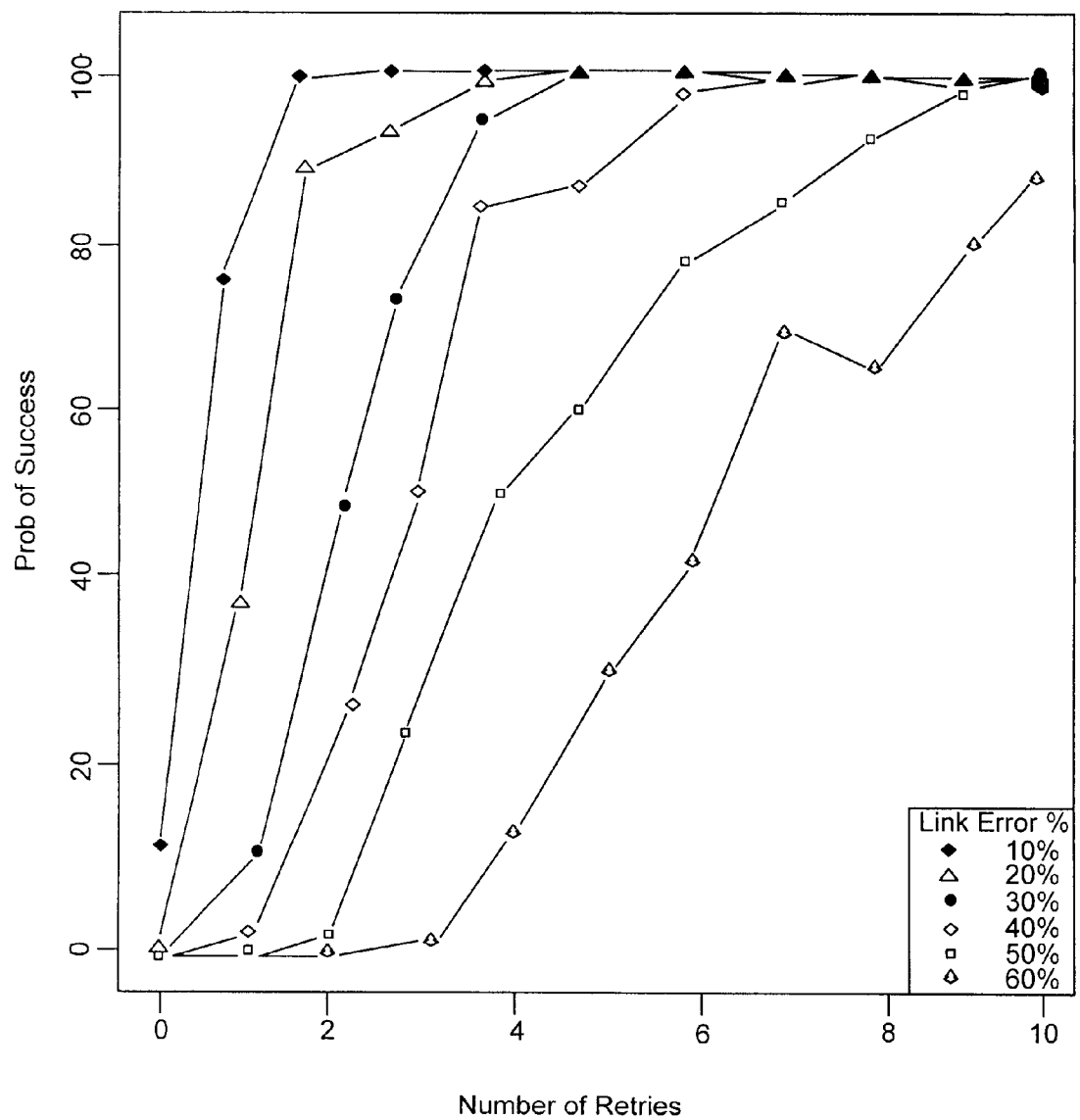
FIG. 2 is a graph illustrating the detrimental effect of multiple retransmissions of data packets over poor quality links.
Figure 3:
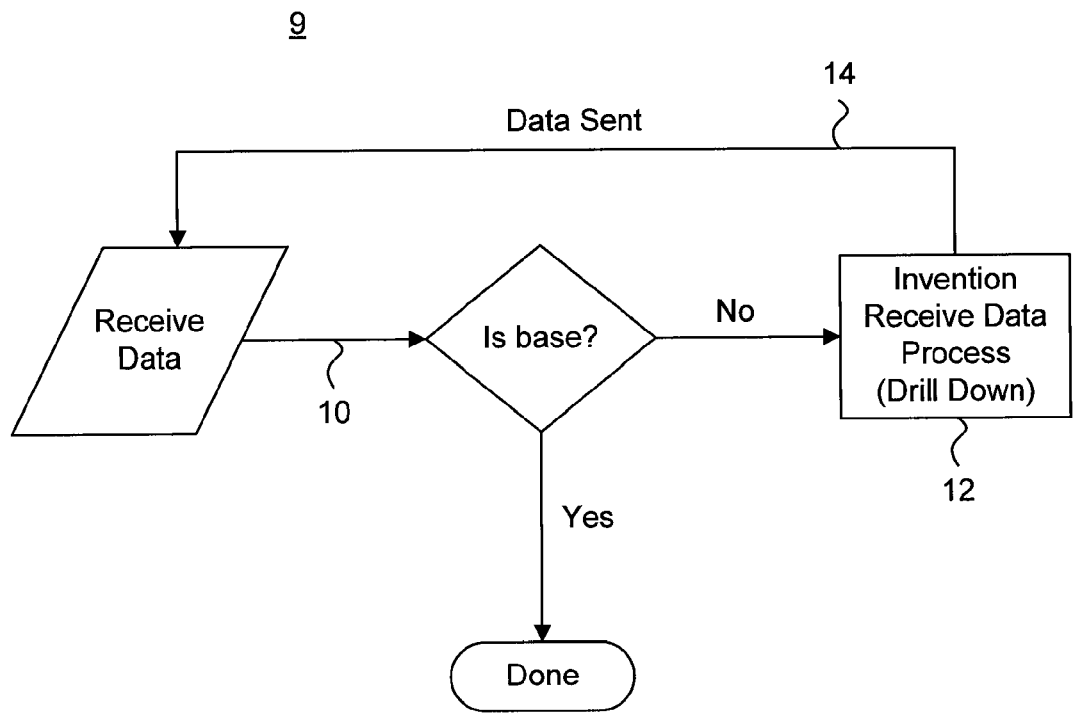
FIG. 3 in a flow chart illustrating an overview of network operation in accordance with the present invention.

Referring now to FIG. 3 there is shown a graphic illustration of a segment of a wireless network in which a plurality of nodes or modules 9 are spatially oriented substantially the radio transmission distance away from each toward a base station (not shown). Each such node or module 9 of the Wireless Sensor Network (WSN) uses low-bandwidth radios to create a self-healing wireless mesh network in which each node or module is capable of receiving and transmitting data packets or messages, and of sending a signal indicative of having received a data packet or message from another node. In WSN networks, nodes route data toward a centralized point in the network referred to as a base station. Nodes are battery operated and attempt to increase their lifetime by minimizing radio communication, a highly energy-expensive action. Thus, as illustrated in FIG. 3, routing through the network must attempt to find the most reliable path to deliver data via one or more nodes to a base station while minimizing communication. Data reliability and energy conservation are inverse objectives of routing data packets for delivery through the WSN. Usually improving reliability is at the cost of energy, or vice versa. A node 9 that receives a data packet retransmits 10 (and possibly aggregates its own data) toward a base station. If not successful in retransmitting to the base station (or to another node in a path toward the base station), then additional processing 12, as described later herein, is required prior to the node 9 returning 14 to a wait state for receiving subsequent data packets.

Figure 4:
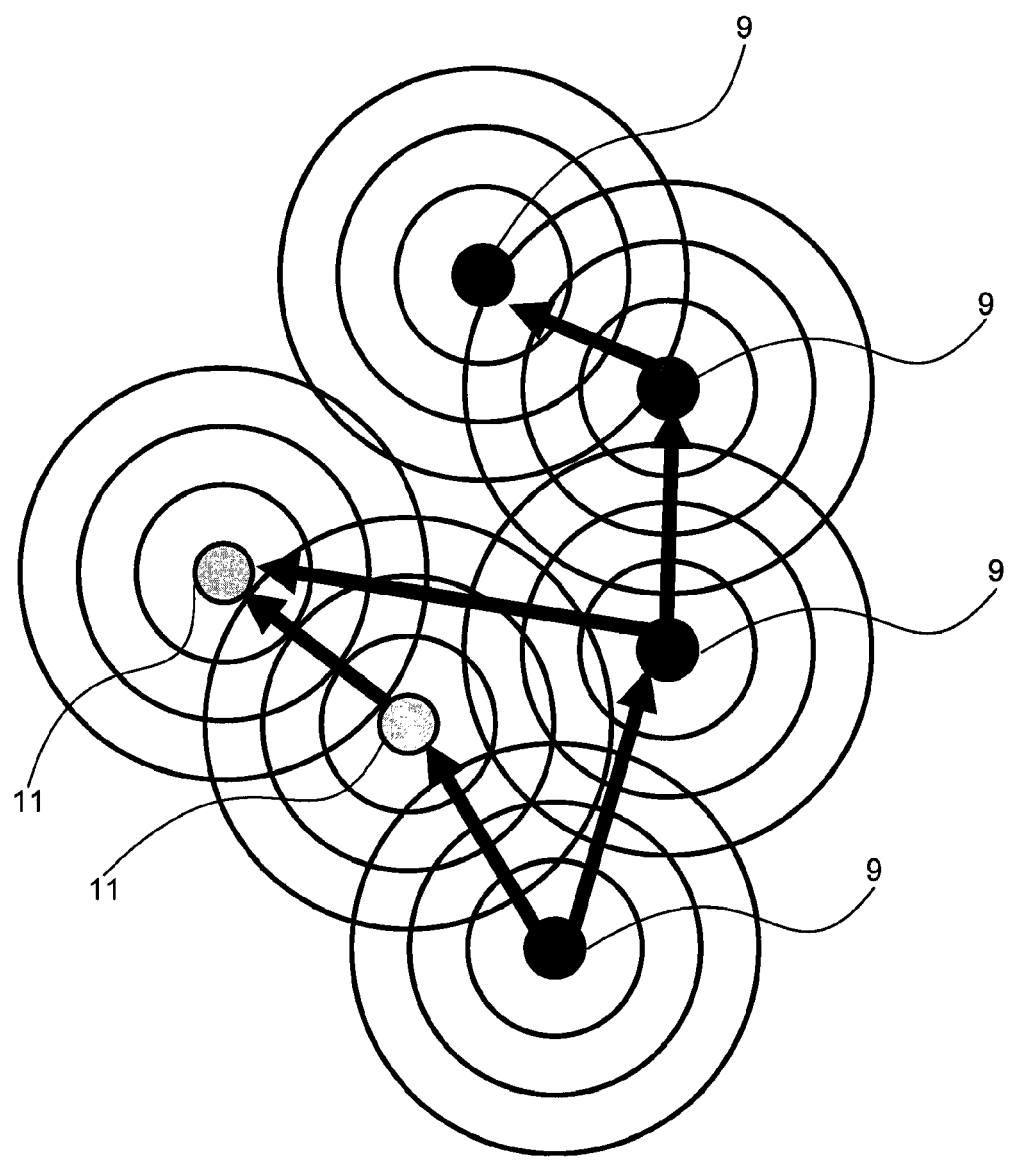
FIG. 4 is a graphic illustration of Flood operation of distributed nodes in a wireless network.

For highly reliable routing, a Flood scheme, as illustrated in FIG. 4, attempts to send data packets on all possible paths to a base station. Thus, if there exists a single path from a node to the base station, Flood will find it since it attempts all permutations. Of course, if all permutations are tried then the entire network expends energy in forwarding the data from the node to the base station.

As shown in the figure, though a single good path exists among the nodes 9, all nodes 9, 11 are expending energy to attempt to find a path to a base station. In this case the nodes 11 are wasting energy in attempting to find a path to the base station.

Figure 5:
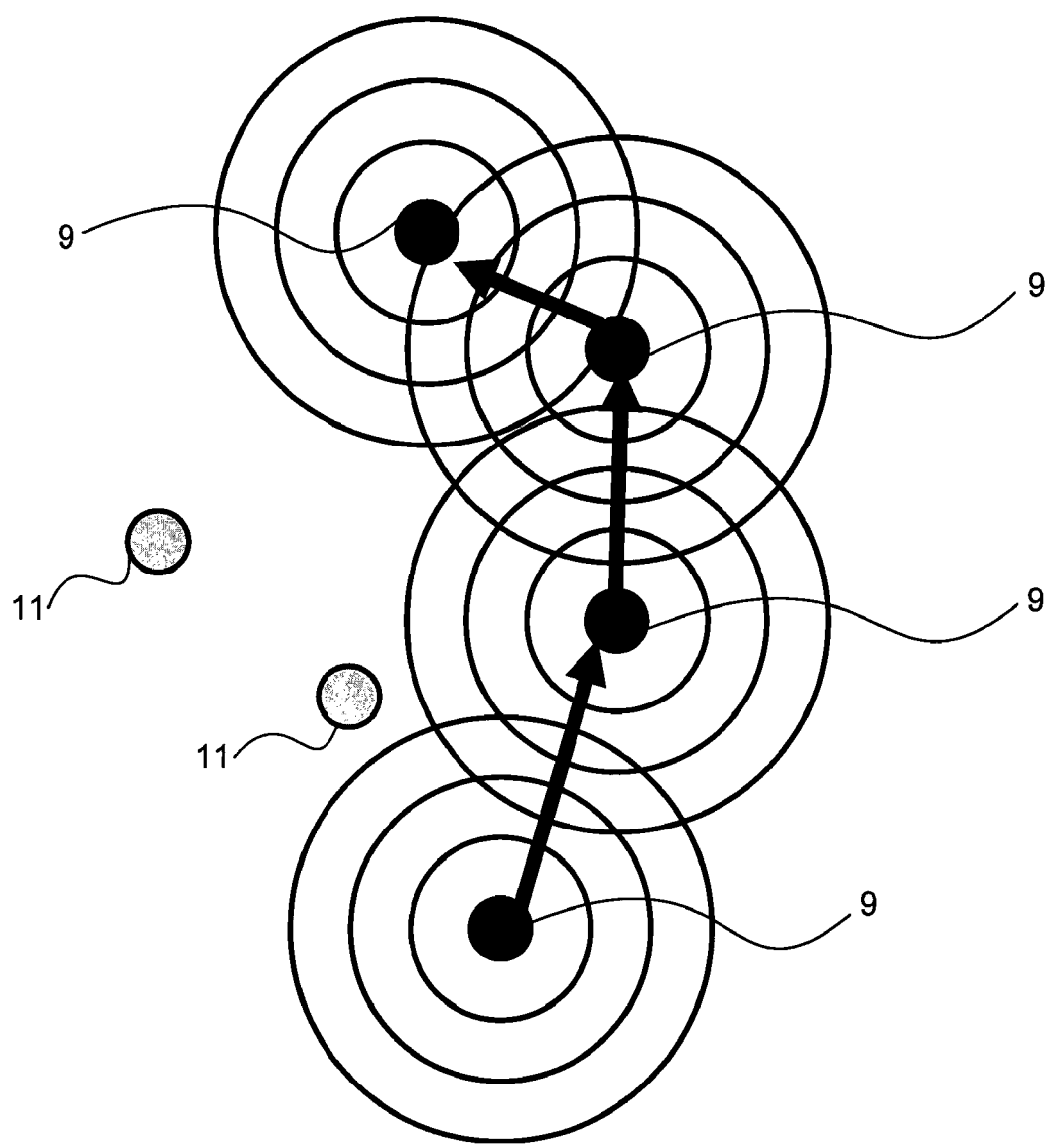
FIG. 5 is a graphic illustration of a data path formed among selected nodes.

For energy efficiency, path routing is preferred with minimal energy expended to find and form a single good path to the base station. Then, that path can be reused for every data packet sent. Since data travels only over a single path, only the nodes 9 along the path expend energy to send the data toward a base station, as illustrated in FIG. 5. The data travels along a single path resulting in the least amount of energy expended in sending the data. However, reliability issues arise at any breaks along the path that will cause the data to be lost.

Wireless link quality is known to vary over time, and links that were good when the path was established can become poor. Best-path routing can be affirmed by periodically using energy to recalculate the best path to the base station. If the period used to recalculate the optimal path is too long, nodes may attempt to use bad paths. If the period used is short, the network will drain its energy rapidly. Since the variation of link quality over time is difficult to determine, most routing schemes use a single network-wide period based on optimizing network lifetime, but if a path goes bad between update periods, the data sent along that path is lost.

In accordance with an embodiment of the present invention, a path that exists as formed to transmit data packets through the WSN will be used. However, if a link along the path degrades, an embodiment of the present invention uses the Flood scheme in such a way as to provide the reliability of Flooding but with minimum expenditure of energy by localizing the Flood to the area where the link has degraded.

Figure 6:
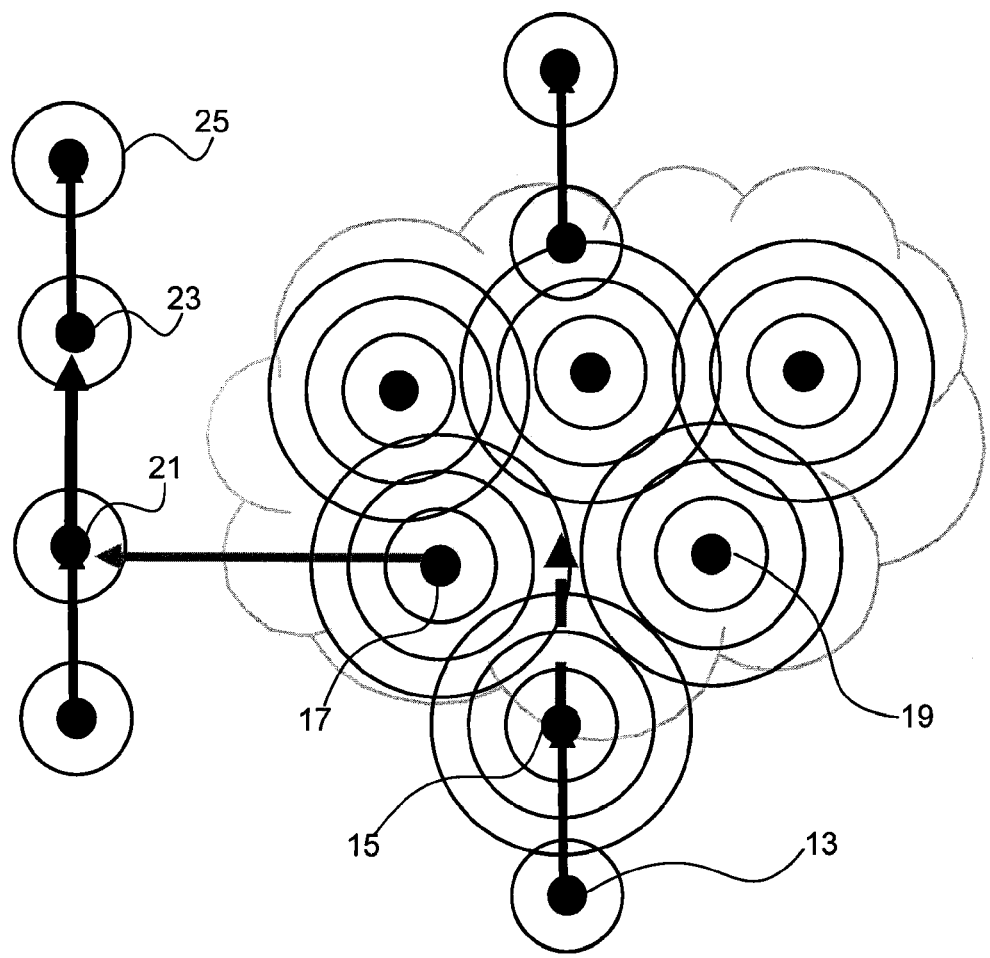
FIG. 6 is a graphic illustration of Flood operation at and about a bad link.
Figure 7:
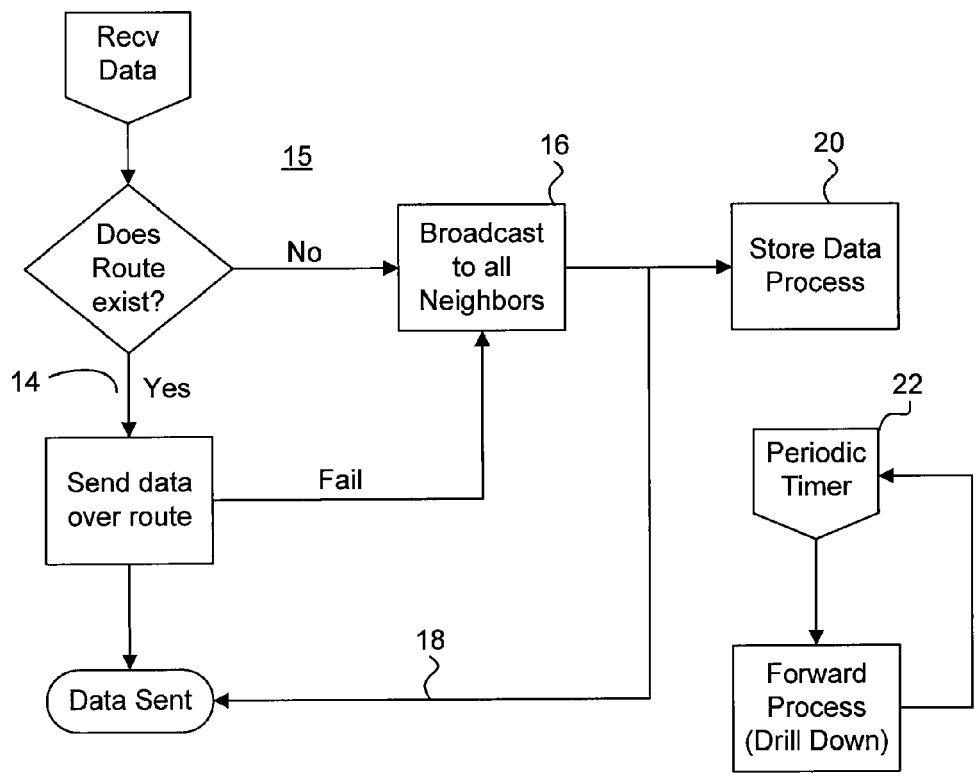
FIG. 7 is a flow chart illustrating operation of a network according to an embodiment of the present invention.

Thus, as graphically illustrated in FIG. 6 and in the flow chart of FIG. 7, the data follows along the path 13-15 until it reaches a point where it cannot be forwarded due to link degradation, at which point the unsuccessful node 15 begins a localized Flood by broadcasting 16 to all neighboring nodes in the network. Each node 17, 19 that receives the data attempts to send it over its own path. In the case that a receiving node cannot forward the data over its own path, the unsuccessful node 15 again attempts to Flood the data out over the WSN. Eventually the data is forwarded 18 to a node 21 that has a good path, and the data is sent over that good path 21, 23, 25 toward the base station.

In this embodiment of the invention the energy is expended on exploring multiple paths only within an area where the paths are poor. Once the data reaches a node 21 which has a good single path, the Flooding exploration stops and the data is forwarded over the good path.

This embodiment of the invention attempts to overcome limitations in path routing by attempting to find alternate paths when the optimal path has degraded, and this assumes that a path exists. In some cases, portions of the network including one or more nodes may be periodically disconnected from the WSN.

Figure 8:
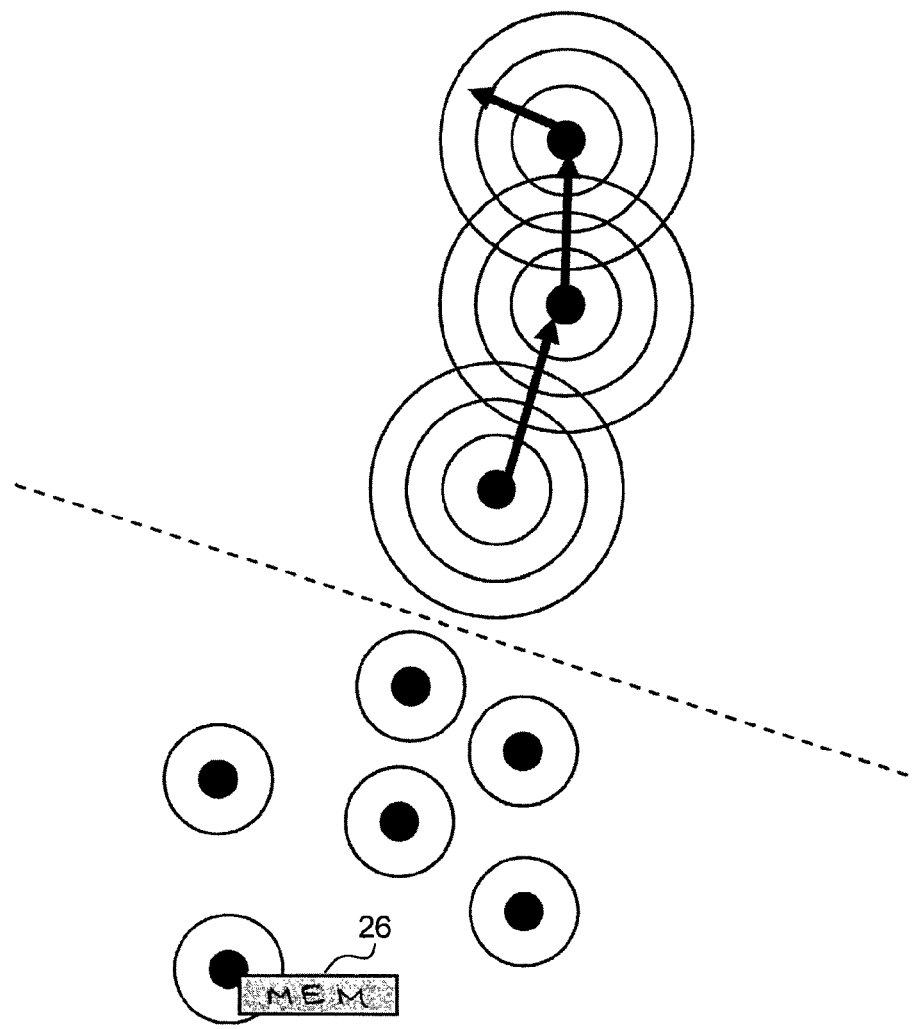
FIG. 8 is a graphic illustration of operation of a disconnected node with memory.

In a delay-tolerant network using path routing, when no path exists to the base station for a portion of the network, each node stores 20, 26 its own data locally, as illustrated in FIGS. 7 and 8, until a path is discovered. In a time-sensitive network, the data must arrive at the base station by a deadline. Storing the data locally until a path from that node can be discovered may take too long, particularly if portions of the network are continually connecting and disconnecting.

Figure 9:
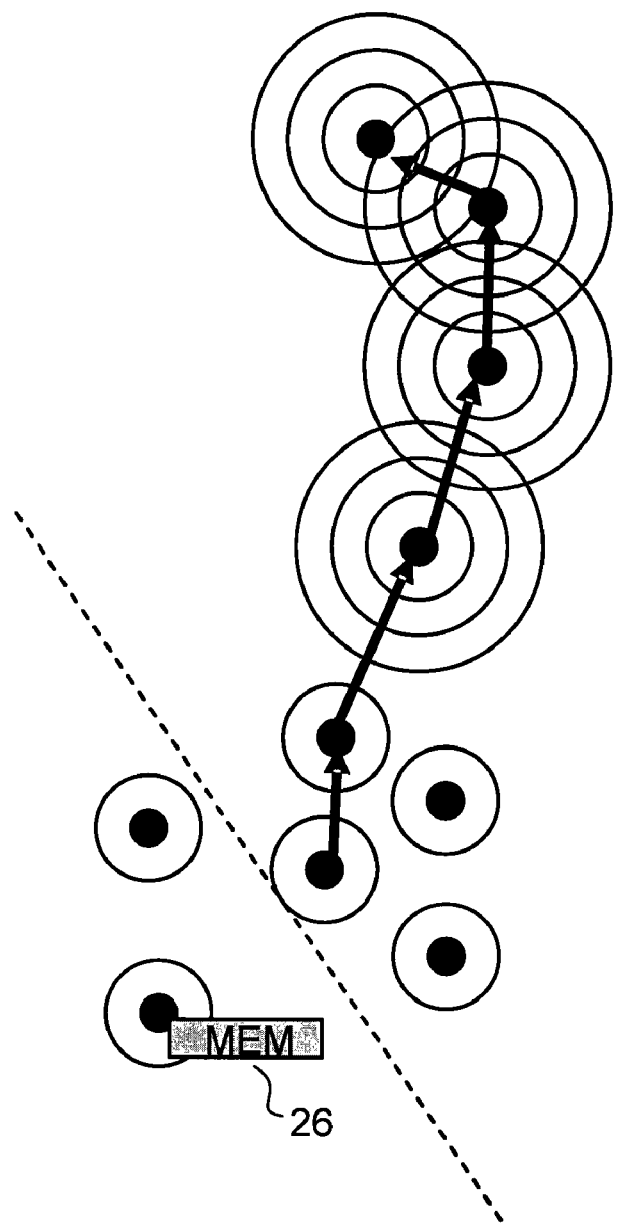
FIG. 9 is a graphic illustration of operation of a wireless network with re-connected nodes.

In a delay-tolerant network, stored data is localized 26 at a single node as illustrated in FIG. 8. Depending upon the network conditions, end-to-end path formation may be very improbable. This is particularly possible in long-hop networks where error rate can accumulate to be very high. However, portions of the network may regain connectivity while others may remain detached, as illustrated in FIG. 9. The improbable nature of complete path formation in some networks make storing time-sensitive data impractical since time deadlines will likely pass before a path is formed.

Figure 10:
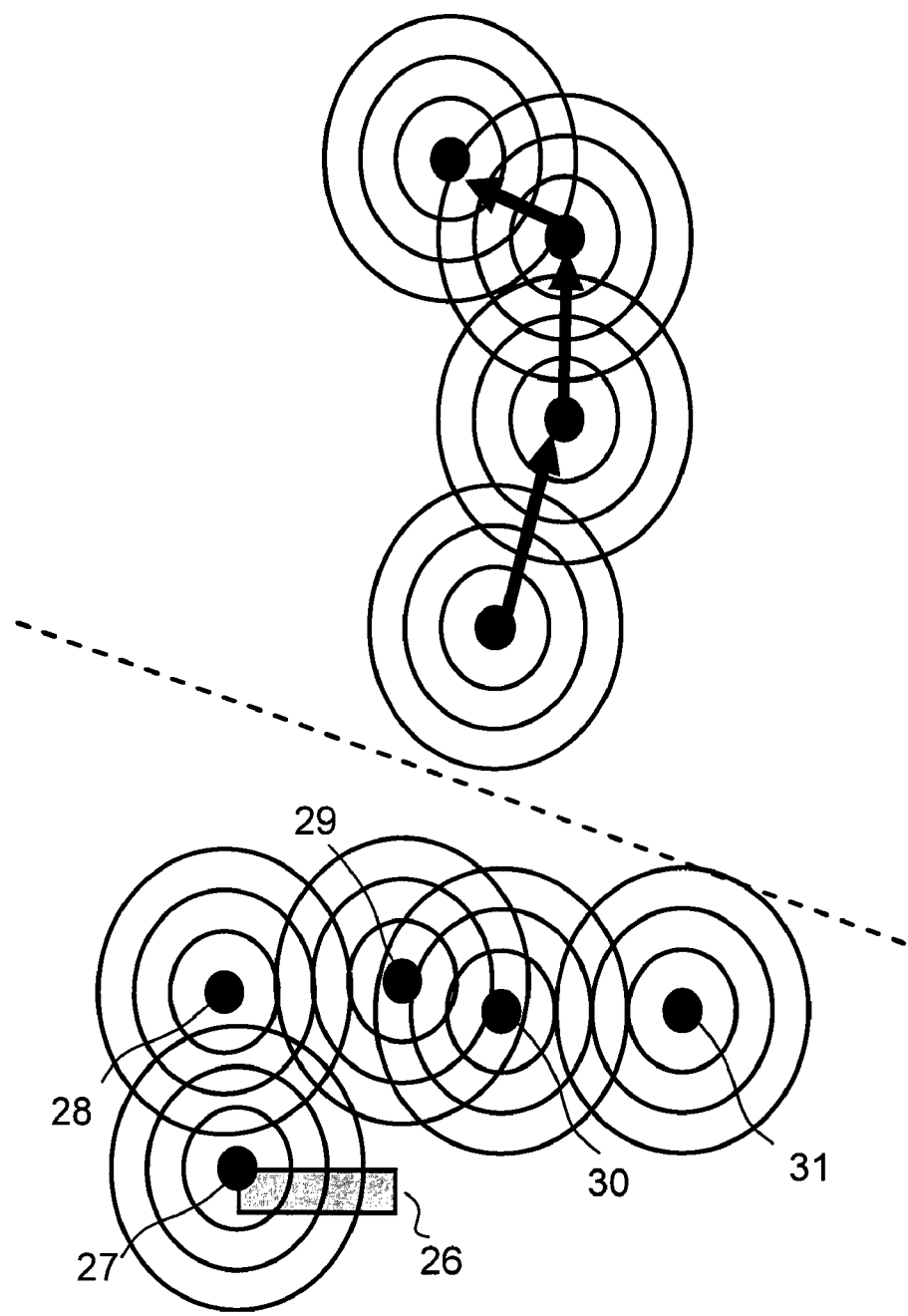
FIG. 10 is a graphic illustration of operation among isolated nodes.
Figure 11:
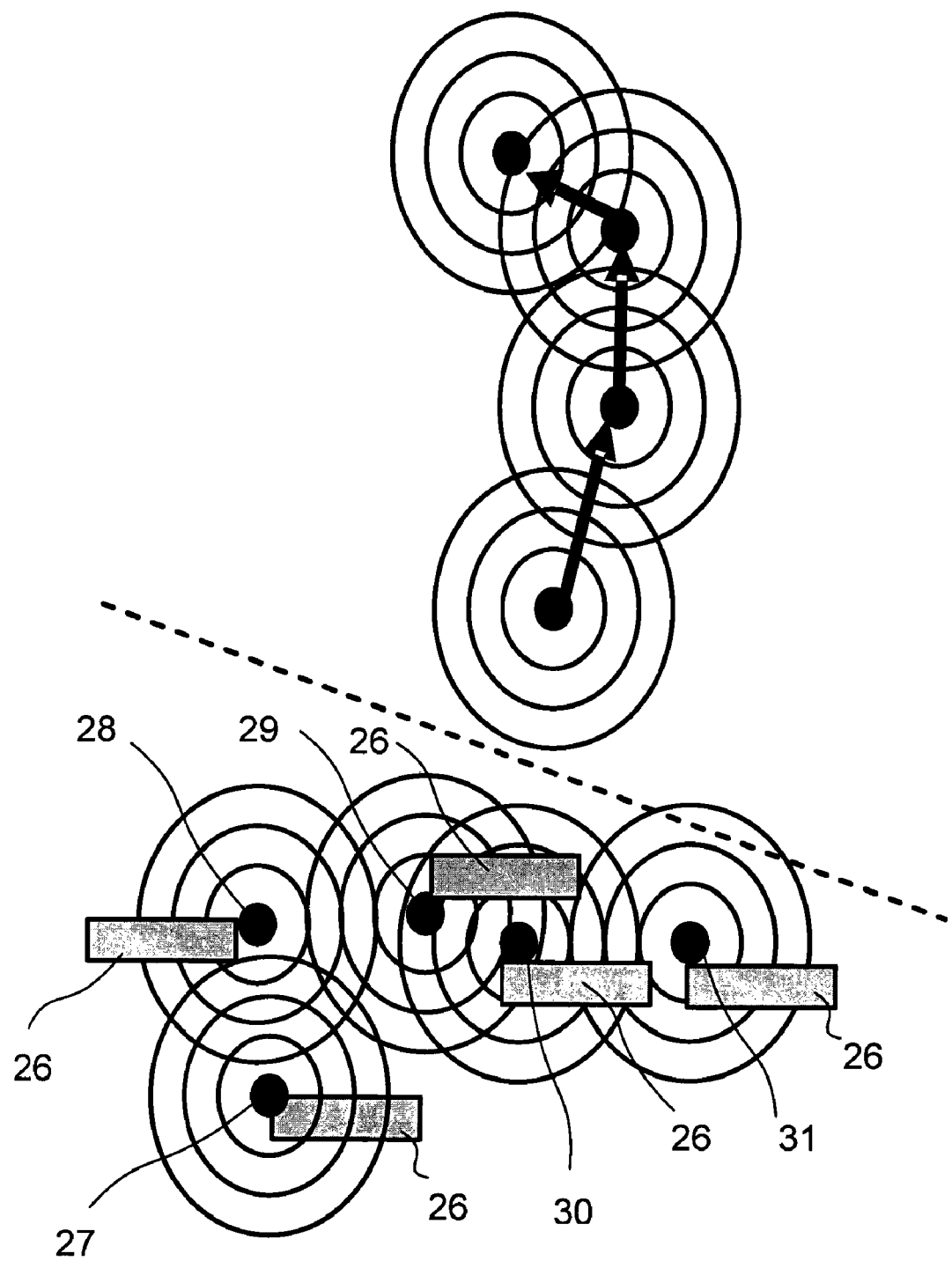
FIG. 11 is a graphic illustration of data packets moving laterally among nodes isolated from the network.

In accordance with another embodiment of the present invention, storage is a practical solution for moving time-sensitive data quickly through the WSN. If data is unable to progress toward the base station along a path, as illustrated in FIG. 10, the data moves laterally looking for alternate paths toward the base station, as illustrated in FIG. 11, and in addition to forwarding the data laterally, each node 27-31 that receives the data will also store 26 it locally. Then, if a path becomes available from any node that has stored the data, it will be forwarded toward the base station.

Figure 12:
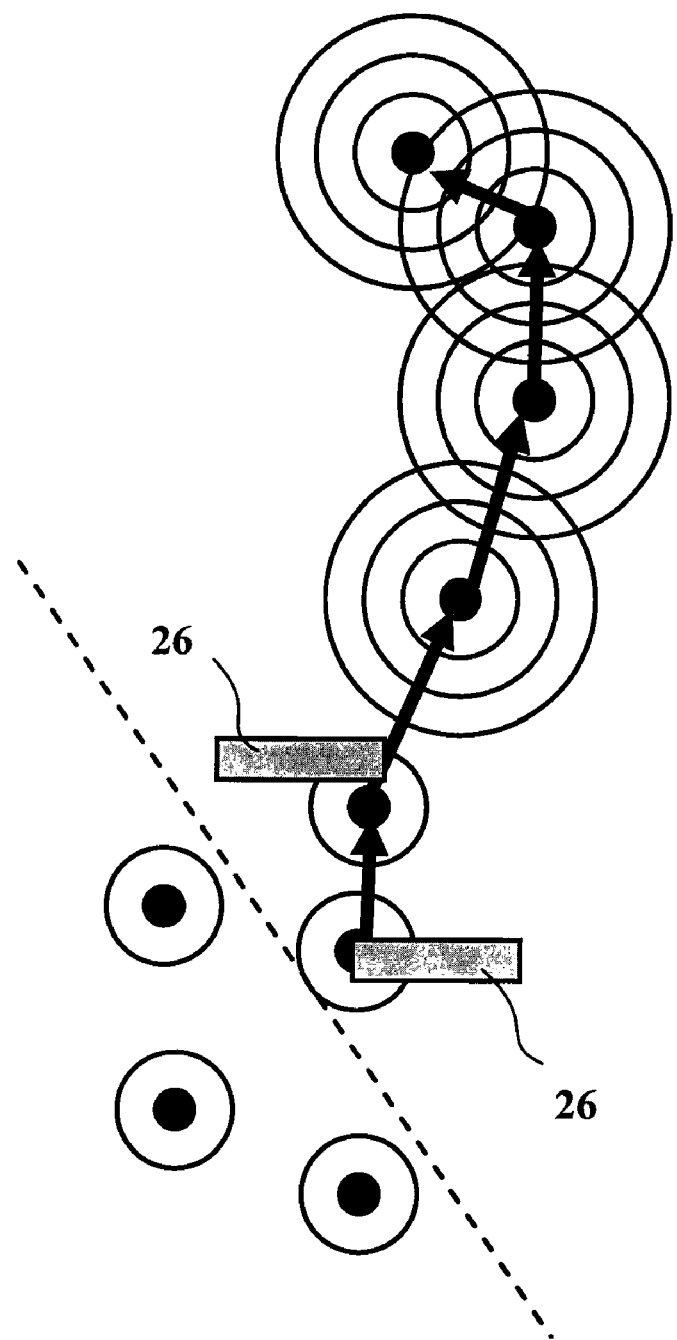
FIG. 12 is a graphic illustration of transmissions among re-connected nodes.

Thus, as illustrated in FIGS. 10, 11, data that is initially created by a node in a disconnected portion of the network is not able to route toward the base station, but attempts to move laterally through the WSN being stored 26 at each receiving node. Later, as the network connectivity changes, as illustrated in FIG. 12, a portion of the nodes which contain the data are now connected to the network and can route toward the base station. The original node may still be disconnected but its data has found a path to the base station through the spatial distribution and storage 26 of the original data.

Figure 13:
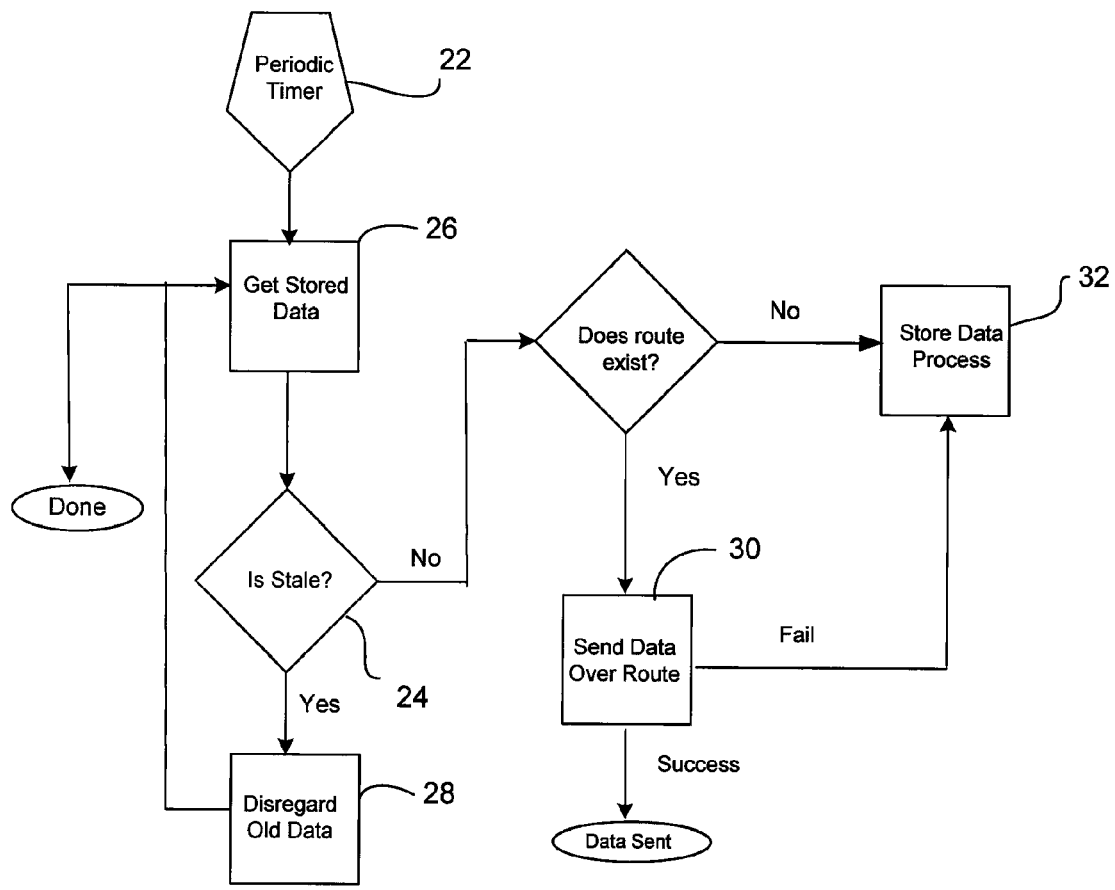
FIG. 13 is a flow chart illustrating network operation according to an embodiment of the present invention.

Storage efficiency and energy efficiency of the WSN may be improved according to the present invention by the nodes periodically removing old data which has passed its deadline, making room for more recent data. As shown in FIG. 11, the disconnected group of nodes which stored the original data may eventually remove the stale data that passes its lifetime, as indicated in the flow chart of FIG. 13. Thus, a periodic timer 22 in a node 15 processes stored data 26 to determine 24 whether it is 'stale' or expired and, if so, deletes 28 the old data. However, contemporary data may be transmitted 30 at least to a neighboring node within radio range along a connected route toward a base station. If such transmission is not successful, then the data remains stored 32 until a subsequent periodic timer cycle during which the data will be determined to be expired or still contemporary. This conserves also the energy which would be spent on sending expired packets.

To improve radio efficiency, data is aggregated into a single packet. Once a path has formed, and stored data can be aggregated into a single packet along with data which is currently originating from the node. Stored data is thereby essentially "piggybacked" on packets of data which the node would otherwise send. These embodiments of the present invention thus enhance the probability of successfully sending a data packet from a node toward a base station by overcoming packet drops at any link along a route.

In conventional mesh networks such success probability may be analyzed along [n] hops, as follows:

p(l)=probability of success over link 1

P(n)=Probability of successfully transmitting a packet over n hops, with each link having a probability p(1 . . . n).

R(n)=the number of retransmissions to achieve 100% success over a route $$P(n) = \Pi p(l) \text{ [from } l=1-n]$$

$$R(n) = 1/P(n)$$

In accordance with the present invention two improvements are achieved in Route Level Retransmissions and Spatial Distribution. Route Level Retransmissions improve the R(n) for any given path. The expected hop to drop a packet (thereby causing a retransmission) is calculated as follows:

N=number of hops p(l)=probability of success over link 1

E(D)=the expected number of hops before a packet is dropped $$E(D) = \Sigma(n * p(l)^{\wedge}(n-1) * (1-p(l))) \text{ [from } n=1-N \text{ and } l=n]$$

According to the present invention, Route Level Retransmission resends the packet from the node it was dropped at instead of retrying from the originating node. This changes the R(n) to the following:

$$R(n) = (1/\Pi p(l) \text{ [from } l=n-E(Dn)]) + R(E(Dn)) \text{ where } E(Dn) > 1$$

$$R(n) = 1/P(n) \text{ where } E(Dn) = <1$$

Thus, in a conventional WSN, a node continues to retransmit from the originating node, not taking advantage of the fact that the data packet may have gotten quite far along a path toward a base station. In contrast, the present invention takes advantage of the fact that a data packet has gone Dn number of hops to a node that then tries to resend from there. Since Dn is closer to a base station than the original node, its probability of success should be higher. This makes a retransmission from Dn much more likely to arrive at the base station than a retransmission from the originating node n.

The present invention also improves the P(n) of a single packet by spatially distributing the packet over a subset of the neighboring nodes in radio range of the dropping node. These nodes can then resend the packet along their own paths, improving the probability of packet delivery to the base station. The number of nodes receiving a distributed packet is as follows:

S(x)=number of nodes in radio range of node x p(ls)=the link quality between node x and a node in S(x)

M(x)=the number of nodes which receive a spatially distributed packet sent by node x.

$$M(x) = \Sigma p(ls) \text{ [from } ls=1-S(x)]$$

Since the M(x) nodes also forward the packet along their paths, the new P(n) becomes:

$$P(n)=(\Pi p(l) \text{ [from } l=n-E(Dn)])*(1-(\Pi(1-P(x))) \text{ [from } x=1-M(E(Dn))]$$

The present invention thus improves the probability of successful transmission of a data packet over n hops by attempting to send data to M neighbors from the point of failure E(Dn). The probability of success is increased because there are M more routes the data is simultaneously taking.

The present invention is particularly beneficial and advantageous in Long Hop Networks and in High Density Networks. One implication of P(n) is that as n gets larger the P(n) gets smaller. This means that the greater number of hops in a network lowers the probability of successfully sending the packet over the entire route.

Figure 14:
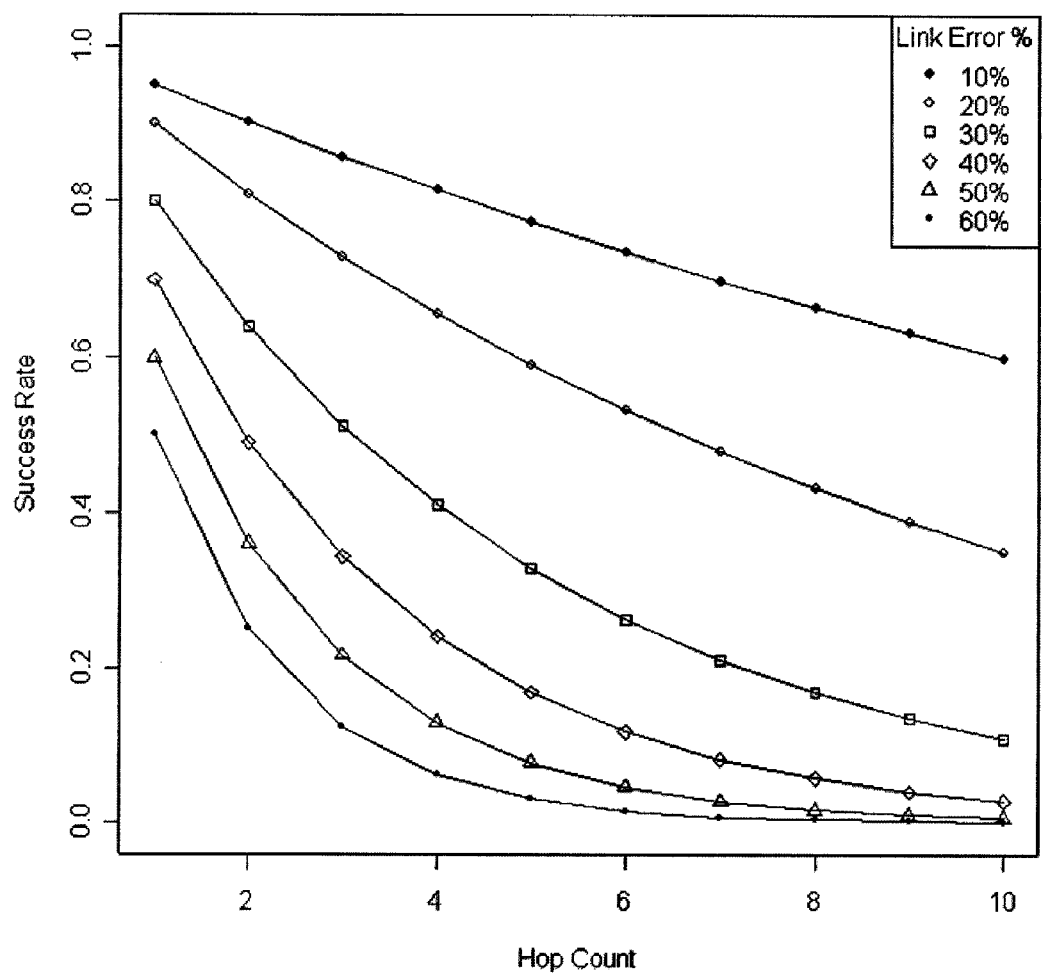
FIG. 14 is a graph illustrating hop count v. success rate for different error factors.

The graph of FIG. 14 illustrates Hop Count (n) vs Success Rate for different Line Errors Rate (1−p(x)).

As shown, even good link qualities (90%) tend to have poor success rates (60%) as the hop count increases (10 hops).

Figure 15:
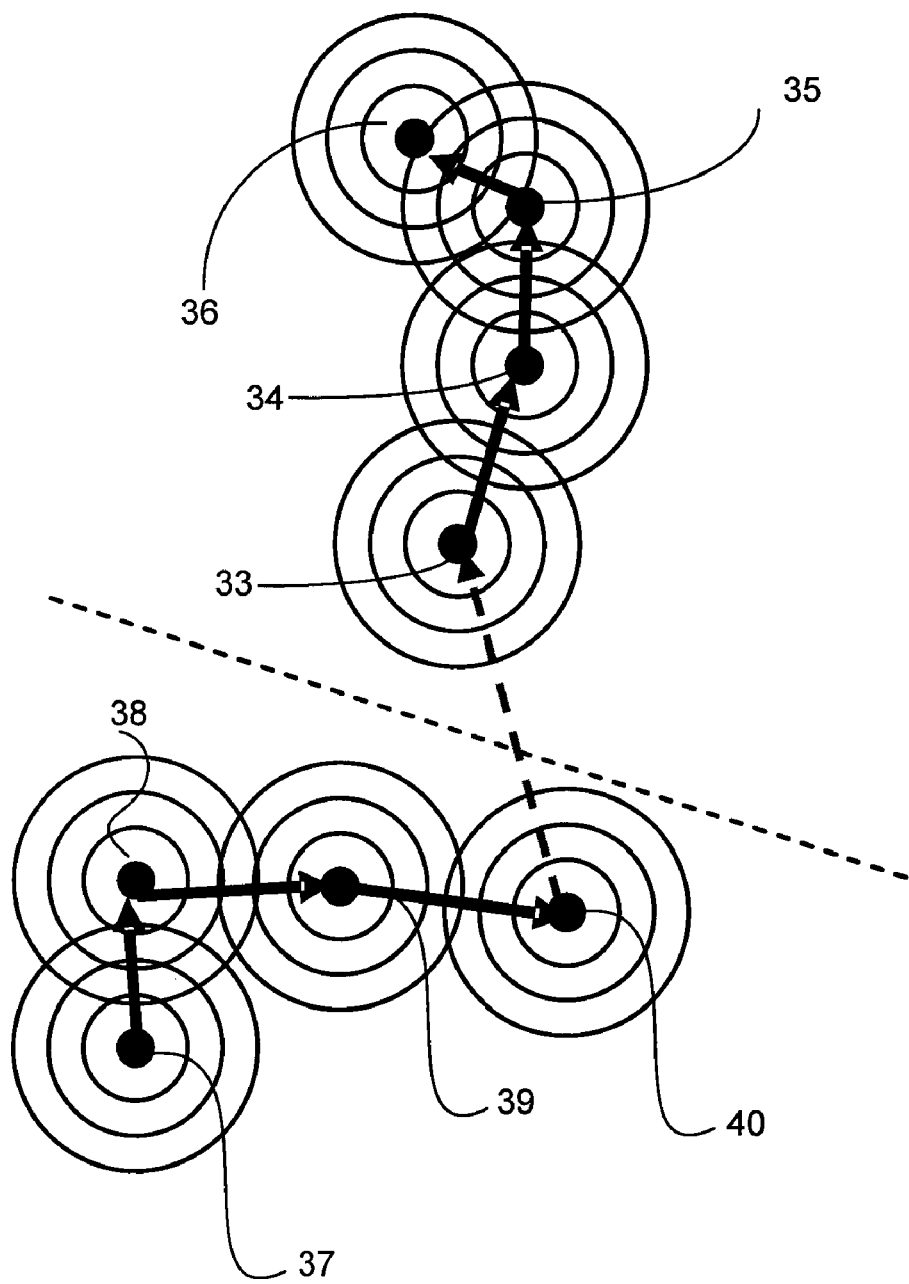
FIGS. 15 and 16 are graphic illustrations of long-hop networks fragmenting into sub-networks.
Figure 16:
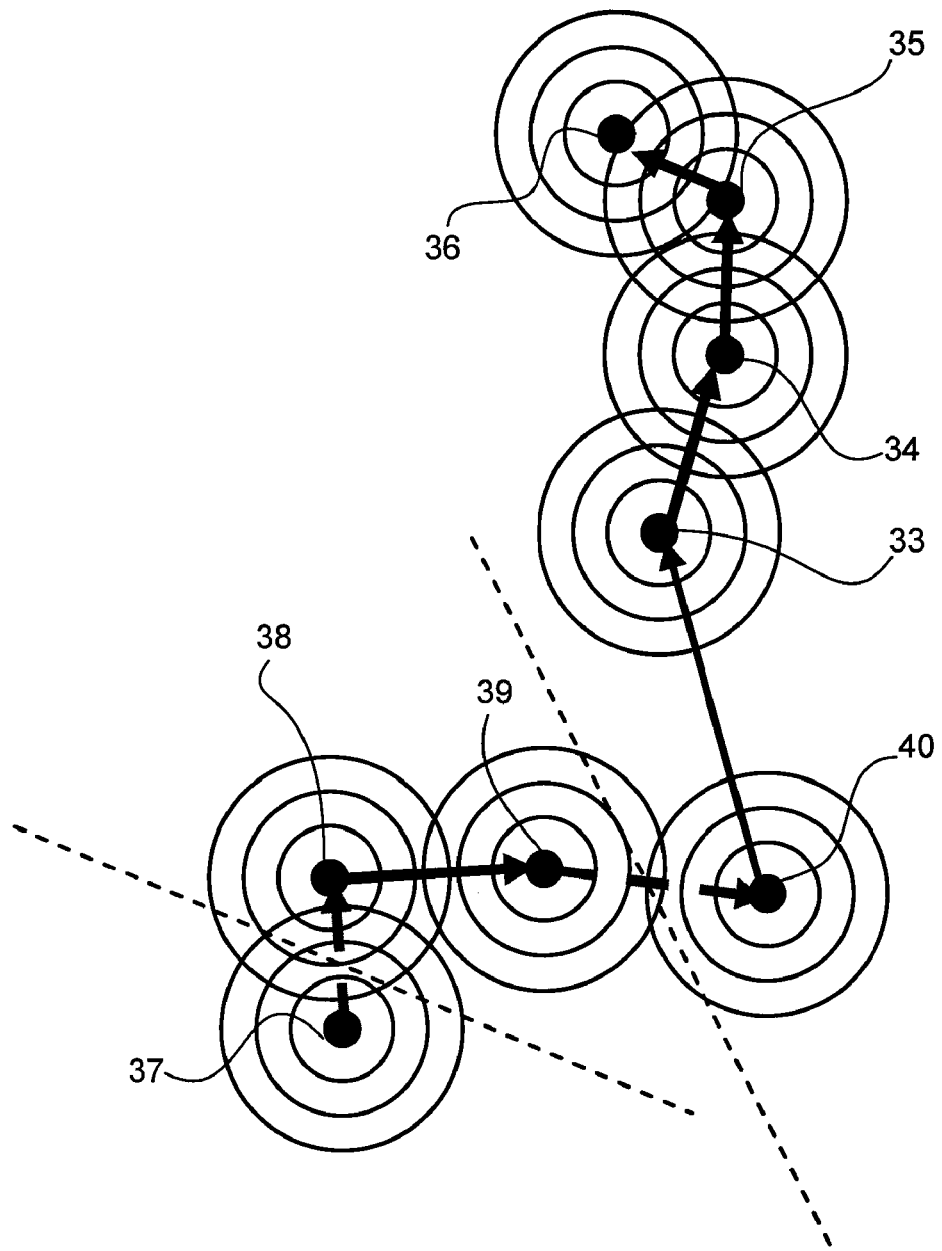

For this reason, long hop networks tend to become sets of disconnected sub-networks, and these sub-networks can merge with other sub-networks or can fracture into more sub-networks, as illustrated in FIGS. 15 and 16.

In these situations the present invention improves the WSN by reliably forwarding the data:
1) by routing data outside the given path: As illustrated in FIGS. 15 and 16, an embodiment of the present invention attempts to jump the gap by sending a broadcast message out to any node within radio range that can "hear" it. This can potentially be any of the nodes 33-36, as shown.
2) by also spatially distributing the data over all the nodes in the sub-network: As illustrated in FIGS. 15 and 16, the nodes 37-40 spatially distribute the data amongst each other so that when one of these nodes is once again a part of the network, it will forward the data. This can actually be used to forward data in a staged manner from sub-network to sub-network until the data reaches the base station.

Another implication of P(n) is that a very poor p(x) can reduce P(n). This means a single bad link can cause a path of good links to fail. In most cases this requires retransmissions to overcome the bad link, but in high-density networks retransmissions can have substantial impact.

In high-density networks, retransmissions of data along a path can lead to congestion. High-density networks, with frequent communication needs, have a tendency to mistake data loss due to congestion as data loss due to environment. In doing so, the nodes retransmit lost packets multiple times. Packet retransmissions in turn cause more congestion, leading to a collapse of the network.

Figure 17:
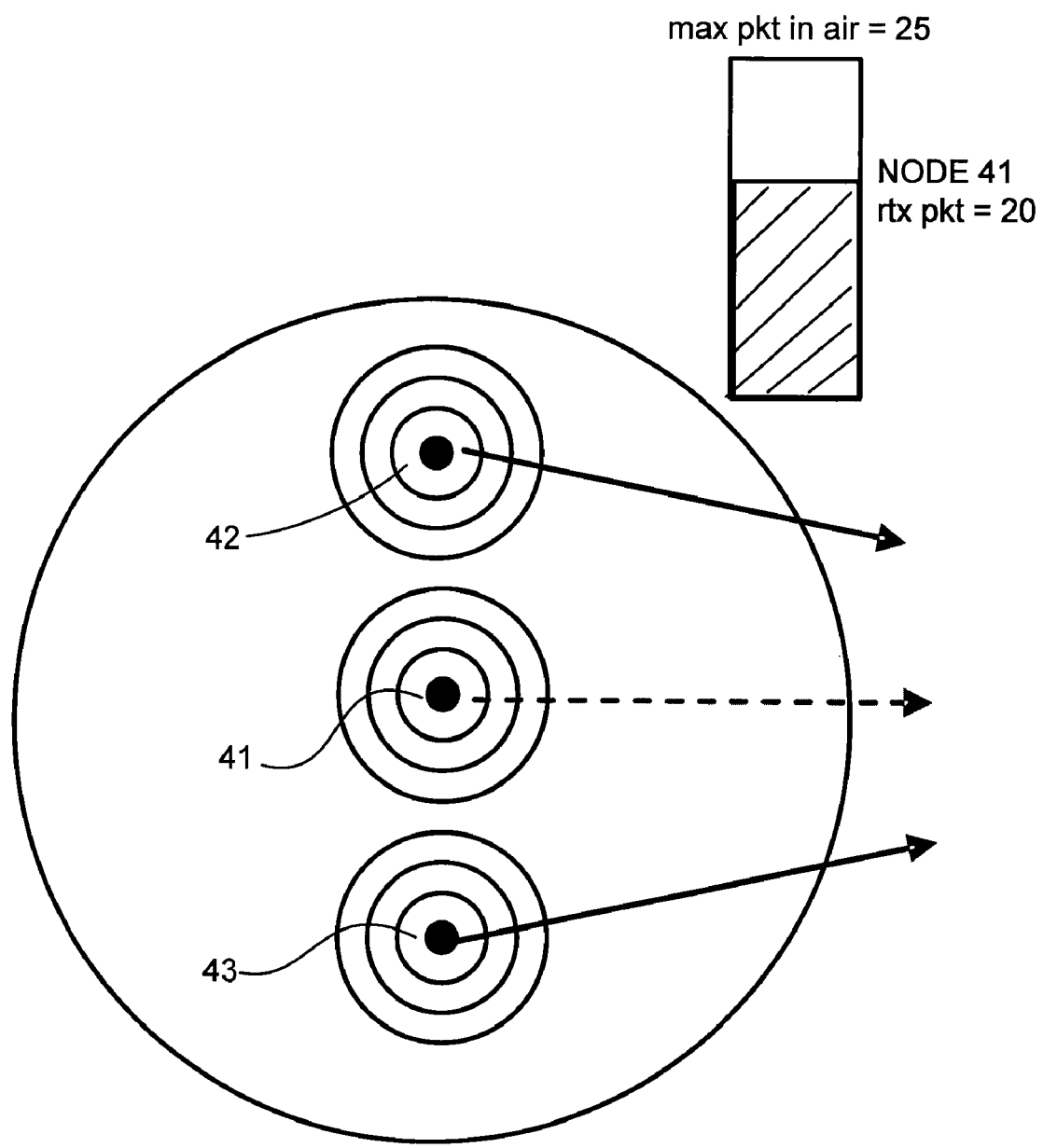
FIGS. 17-19 are graphic illustrations of operations of nodes in a segment of a high-density network.
Figure 18:
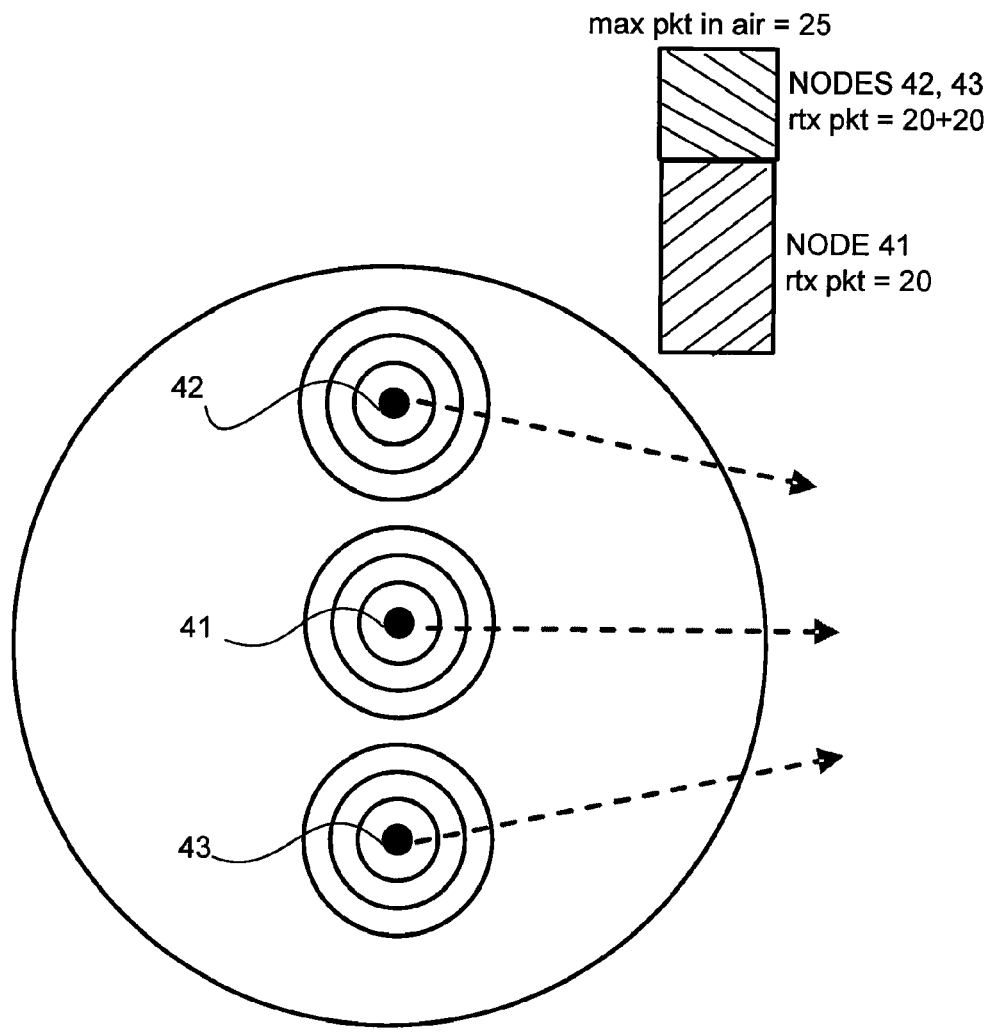
Figure 19:
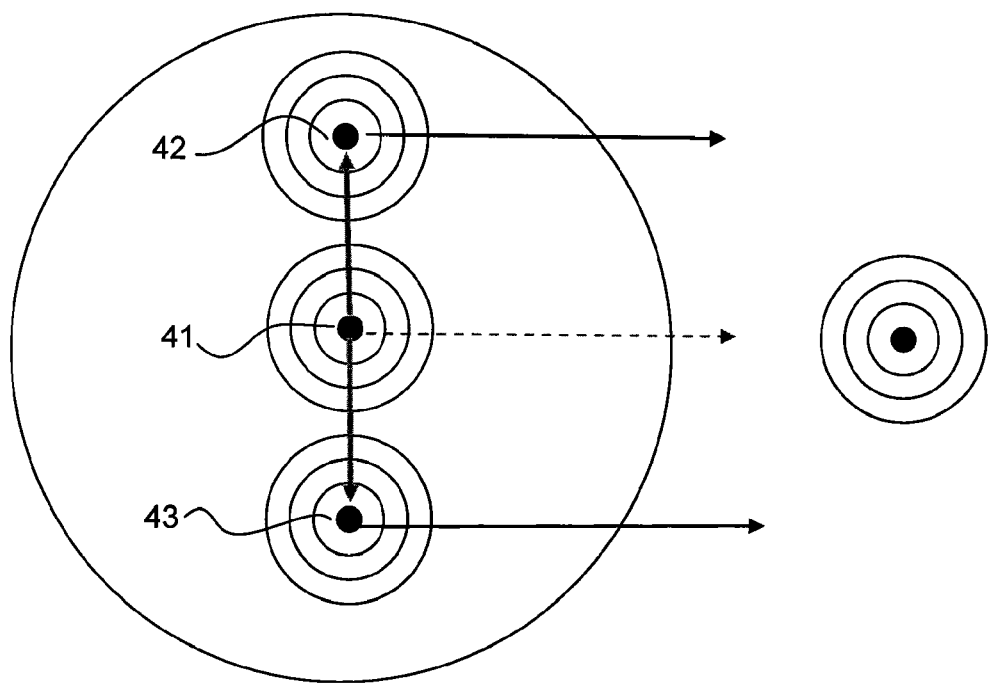

FIGS. 17-19 illustrate a segment of a high-density WSN.

As the node 41 retransmits to overcome its poor link, it begins to cause collisions with the packets transmitted by nodes 42, 43. The nodes 42, 43 then retransmit received packets and saturate the bandwidth of the radios, causing a congestion collapse. In essence, poor link quality of one node causes the entire high-density WSN to stop transmitting.

In accordance with the present invention, this situation is avoided by:
1) Reducing the number retransmissions: Once a node 41 has done a minimum number of retransmissions to attempt to overcome a poor link, an embodiment of the present invention attempts to "jump" to another path, e.g., the data will jump to one of the nodes 42, 43.
2) Aggregate the "jumped" packets and "piggyback" them on existing packets: Thus, the nodes 42, 43 will aggregate the "jumped" data from the node 41 and forward it within its own packets.

Operation of the present invention was analyzed using EmStar, an open-source simulator specifically configured for analyzing Wireless Sensor Networks. In the analyses, EmStar was configured to create a Long Hop Chain Network of 20 nodes, and was configured to simulate a path-loss radio model that emulates the following real radio characteristics:
1) Exponential Decay over distance: The radio strength degrades exponentially as the nodes get farther apart; and
2) Normalized Probability of Packet Loss, i.e., links quality (indicated by packet loss) varies over time. In other words, a good link will stay good, a bad a link will stay bad, and links will vary between to the two states gradually.

Nodes were positioned for operation and analyses of the present invention in such a way that they had on average a good link to their 1-hop neighbors, a poor link to their 2-hop neighbors, and no link to their 3-hop neighbors. This configuration emulates real-life Long Hop Network conditions experienced in real-life deployment of nodes.

The test involved having the node farthest from the base station (node 20) to send a data packet every 30 seconds. A conventional scheme (e.g., XMesh algorithm commercially available from Crossbow Technology, San Jose, Calif.) was used to form mesh and route data along a specified path among nodes. In an overlay of XMesh, an embodiment of the present invention was installed to augment XMesh. During the test, the following information was recorded per packet:
1) The path cost of the route at the time of packet transmission;
2) Whether XMesh was scheduled to drop the packet, and whether the present invention was able to recover the packet; and
3) The delay between when the packet was sent vs. when it was received by the base station.

Figure 20:
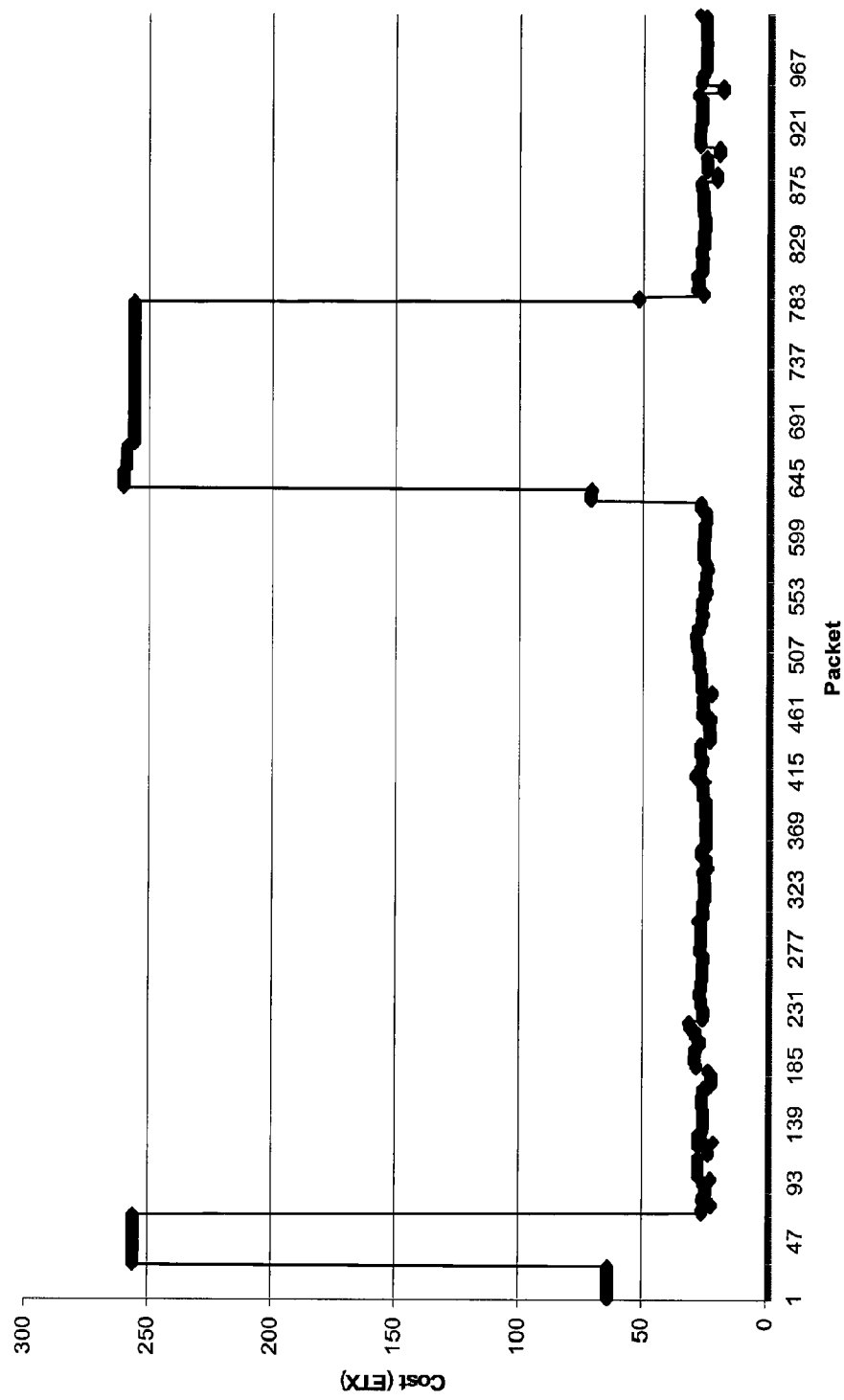
FIG. 20 is a graph illustrating the cost of transmission along a path v. the expected cost per data packet.

The results, as illustrated in the graph of FIG. 20, indicate the path cost in terms of the expected transmission cost (ETX). ETX measures the quality of a path by indicating the expected number of times a packet will need to be transmitted along a path. For a 20-hop network, a perfect path will have an ETX of 20 cost units. In this analysis of more realistic operation of the present invention, the ETX to node 20 remained between 20-40 cost units for most of the experiment. Some time after packet 599, the route completely dissolved. This means that at least node 20 was disconnected from the base station.

Figure 21:
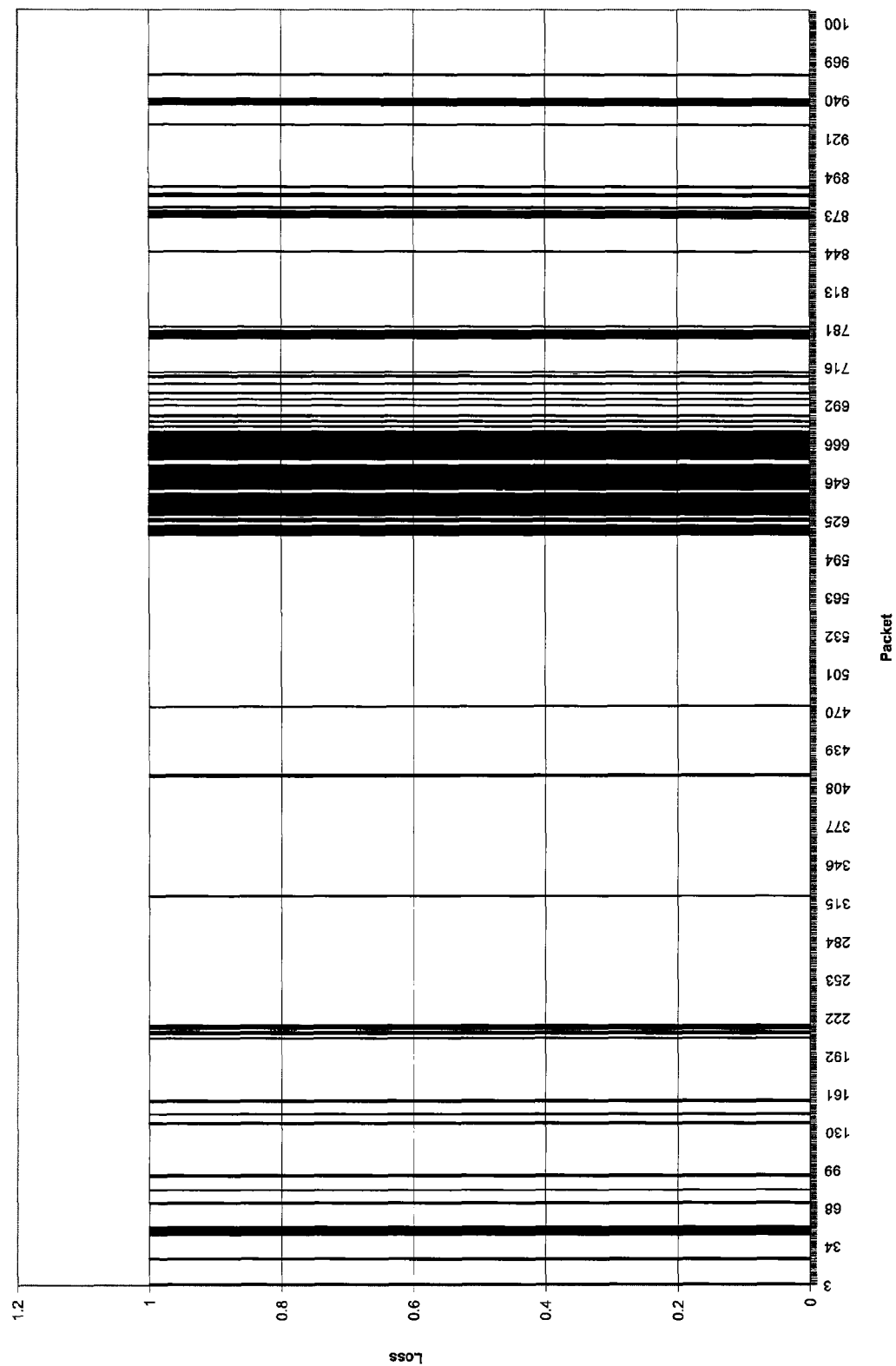
FIG. 21 is a graph illustrating the underlying network dropped or lost data packets.

Referring now to FIG. 21, this graph illustrates that the underlying operation of XMesh dropped particular packets. As expected, a large number of packets were dropped during the time when the Path Cost indicates XMesh was disconnected, as illustrated in FIG. 20. It is noted that XMesh also drops a small number of packets during the good route. This is believed to be due to the variability of the link quality over time. That is, by the probabilistic nature of radio communication, a good route does not guarantee that a packet will be delivered.

Operation of the present invention overlaying XMesh was able to deliver 100% of the packets, and was able to overcome the probabilistic nature of the radio communication and deliver all of the data, as illustrated in the chart of FIG. 22.

Figure 23:
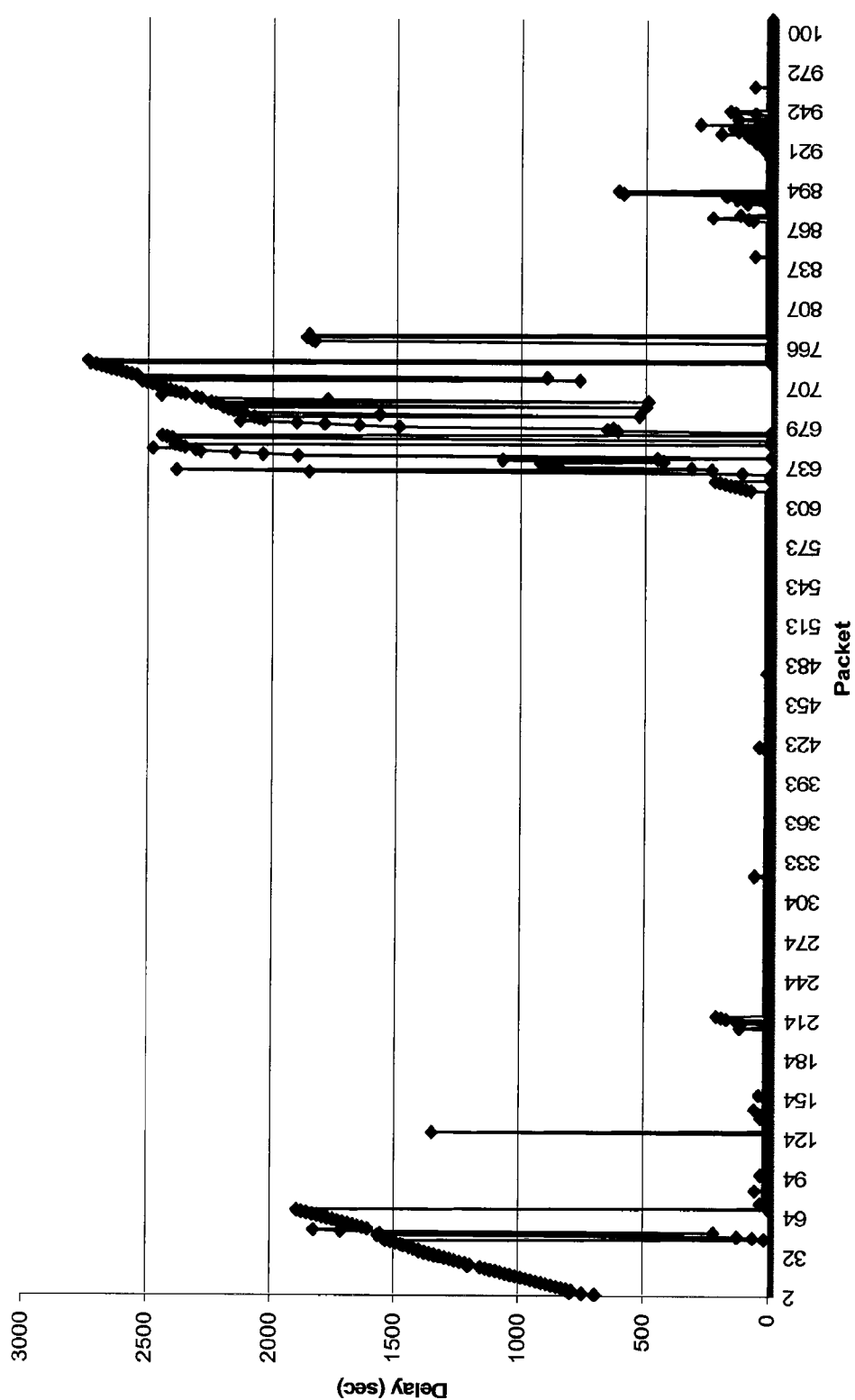
FIG. 23 is a graph illustrating the delay times of transmissions of all data packets in accordance with the present invention during operation over a 20-hop network.

Referring now to FIG. 23, this graph illustrates the delay between sending the packet and finally receiving the packet at a base station after 20 hops. Packets which were not scheduled to be dropped by XMesh had a sub-second delay attributable to the expected delays in transmitting a packet over 20 hops. Higher order delays were the result of recovering a packet, in accordance with the present invention, that the underlying XMesh dropped. These packets have a varying degree of delay based on the state of the network Thus, considering the network conditions by which the route was established, and including packet loss due to probabilistic transmission conditions, the present invention was able to deliver a packet in under 10 minutes, with an average delivery time of about 3 minutes. And, despite network conditions, even in which the route was disconnected, the present invention was able to deliver all of the data packets in under 45 minutes.

Therefore, operation of the present invention with respect to a wireless sensor network (WSN) recovered 100% of data packets intended to be transmitted over a 20-hop segment of a WSN, with associated increased reliability of packet delivery in the network. For time-sensitive data the present invention balances urgency of delivery with efficiency based on the state of the network.

We claim:

1. A method of operating an adaptive network comprising a base station and a plurality of wireless interactive modules disposed at spaced locations with respect to one another in which each module is capable of receiving and transmitting data packets, the method comprising:

identifying a first predetermined path for sending a first data packet from an originating module to the base station, wherein the first predetermined path comprises a plurality of intermediate path modules;

sending the first data packet from one intermediate path module in the first predetermined path to a next intermediate path module in the first predetermined path;

responsive to the one intermediate path module determining that the next intermediate path module failed to indicate having received the first data packet, the one intermediate path module locally broadcasting the first data packet so as to be received by any of the plurality of wireless interactive modules in the adaptive network within a predetermined local radio distance of the broadcasting one intermediate path module;

the any of the plurality of wireless interactive modules that receives the locally broadcast first data packet then sending an indication of successful broadcast receipt to the broadcasting one intermediate module, wherein the indication of successful broadcast receipt is based on the any of the plurality of wireless interactive modules determining a valid path exists from itself to the base station; and the locally broadcasting one intermediate path module, upon receipt of a first indication of successful broadcast receipt, ceasing the local broadcasting of the first data packet.

2. The method of claim 1, further comprising:

the broadcasting one intermediate path module re-broadcasting the first data packet if it does not receive an indication that the any of the plurality of wireless interactive modules was successful in receiving the broadcast first data packet.

3. The method of claim 1, further comprising the next intermediate path module indicating to the one intermediate path module that the first data packet was received by sending a message to the one intermediate path module that includes a unique identification code corresponding to the next intermediate path module.

* * * * *